United States Patent
Zhu

(10) Patent No.: US 12,248,772 B2
(45) Date of Patent: Mar. 11, 2025

(54) CLOUD PLATFORM APPLICATION DEPLOYMENT METHOD AND APPARATUS, ELECTRONIC DEVICE, AND STORAGE MEDIUM

(71) Applicant: SUZHOU METABRAIN INTELLIGENT TECHNOLOGY CO., LTD., Jiangsu (CN)

(72) Inventor: Bo Zhu, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/711,056

(22) PCT Filed: Feb. 28, 2023

(86) PCT No.: PCT/CN2023/078739
§ 371 (c)(1),
(2) Date: May 16, 2024

(87) PCT Pub. No.: WO2023/165471
PCT Pub. Date: Sep. 7, 2023

(65) Prior Publication Data
US 2024/0419418 A1    Dec. 19, 2024

(30) Foreign Application Priority Data
Mar. 1, 2022    (CN) .......................... 202210189966.9

(51) Int. Cl.
*G06F 15/16* (2006.01)
*G06F 8/60* (2018.01)
*G06F 9/445* (2018.01)

(52) U.S. Cl.
CPC ............ *G06F 8/60* (2013.01); *G06F 9/44505* (2013.01); *G06F 9/44526* (2013.01)

(58) Field of Classification Search
CPC ..... G06F 8/60; G06F 9/44505; G06F 9/44526
(Continued)

(56) References Cited

U.S. PATENT DOCUMENTS

| 8,539,480 B2 * | 9/2013 | Malyshev | ................. G06F 8/60 717/110 |
| 9,459,859 B2 * | 10/2016 | Borden | ..................... G06F 8/60 |

(Continued)

FOREIGN PATENT DOCUMENTS

| CN | 104508627 A | 4/2015 |
| CN | 108614688 A | 10/2018 |

(Continued)

*Primary Examiner* — Moustafa M Meky
(74) *Attorney, Agent, or Firm* — IPro, PLLC

(57) ABSTRACT

The cloud platform application deployment method and apparatus, the electronic device and the storage medium are provided in the disclosure. The method includes: acquiring the composition information of the application to be deployed in the current cloud platform, the composition information representing the attribute content and composition logic of the application to be deployed; determining the environmental attributes of the respective components included in the application to be deployed according to the composition information of the application to be deployed; calling the corresponding cloud environment plugins for the respective components according to the environmental attributes of the respective components based on the preset multi-cloud environment configurator; and deploying the application to be deployed to the current cloud platform based on the cloud environment plugins of the respective components.

19 Claims, 3 Drawing Sheets

(58) Field of Classification Search
USPC .......................................................... 709/222
See application file for complete search history.

(56) References Cited

U.S. PATENT DOCUMENTS

| | | | | |
|---|---|---|---|---|
| 9,830,135 | B2* | 11/2017 | Tripathi | ............... G06F 9/44505 |
| 10,175,957 | B1* | 1/2019 | DeAnna | ..................... G06F 8/35 |
| 10,223,083 | B1* | 3/2019 | DeAnna | ..................... G06F 8/70 |
| 10,353,716 | B2* | 7/2019 | Ganesh | ............... H04L 41/0806 |
| 10,776,459 | B2* | 9/2020 | Bojjireddy | ............... G06F 9/455 |
| 11,249,734 | B2* | 2/2022 | Patni | ......................... G06F 8/30 |
| 11,381,476 | B2* | 7/2022 | Fitzer | ................. H04L 41/5045 |
| 11,422,850 | B1* | 8/2022 | Kutik | .................... G06F 9/4843 |
| 11,714,624 | B2* | 8/2023 | Makhija | ..................... G06F 8/60 |
| 11,797,284 | B2* | 10/2023 | Liu | ........................... G06F 8/60 |
| 11,914,975 | B2* | 2/2024 | Delpech de Frayssinet ................ G06F 8/36 |
| 12,135,982 | B2* | 11/2024 | Kutik | ................... G06F 9/44536 |
| 2021/0397712 | A1* | 12/2021 | Gajananan | ............. G06F 21/53 |
| 2022/0276842 | A1* | 9/2022 | Delpech de Frayssinet ................ G06F 8/36 |
| 2023/0025791 | A1* | 1/2023 | Liu | ........................... G06F 8/61 |
| 2023/0056223 | A1* | 2/2023 | Kumar | .................... G06F 21/57 |
| 2023/0168874 | A1* | 6/2023 | Makhija | .................. G06F 9/451 |
| | | | | 719/320 |

FOREIGN PATENT DOCUMENTS

| | | |
|---|---|---|
| CN | 110413288 A | 11/2019 |
| CN | 111580832 A | 8/2020 |
| CN | 113687912 A | 11/2021 |
| CN | 114253557 A | 3/2022 |
| EP | 3128418 A1 | 2/2017 |

\* cited by examiner

CLOUD PLATFORM APPLICATION DEPLOYMENT METHOD AND APPARATUS, ELECTRONIC DEVICE, AND STORAGE MEDIUM

CROSS-REFERENCES TO RELATED APPLICATIONS

The application claims priority to Chinese patent application No. 202210189966.9 entitled "CLOUD PLATFORM APPLICATION DEPLOYMENT METHOD AND APPARATUS, ELECTRONIC DEVICE, AND STORAGE MEDIUM" filed to China National Intellectual Property Administration on Mar. 1, 2022, which is incorporated herein by reference in their entirety.

TECHNICAL FIELD

The application relates to the technical field of cloud computing and, more particularly, to a cloud platform application deployment method and apparatus, an electronic device and a storage medium.

BACKGROUND

With the development of cloud computing technology, developers deploy their developed applications to a cloud platform, and the cloud platform provides operation resources for the applications.

In related art, application deployment and delivery are generally realized based on Kubernetes, while application deployment based on Kubernetes is generally to make the applications into Chart packages in advance, and then application deployment is made in a Kubernetes environment by using a Helm tool.

However, Helm is only a package manager of a Kubernetes platform, so it is only suitable for deploying applications which are based on the Kubernetes platform, and does not support public/private cloud platforms such as OpenStack and AWS, and unified deployment of applications cannot be made in multi-cloud mixed scenes.

SUMMARY

A cloud platform application deployment method and apparatus, an electronic device and a storage medium are provided in the disclosure, to solve defects in related art that unified deployment of applications cannot be realized in multi-cloud mixed scenes.

In the first aspect of the present application, a cloud platform application deployment method is provided, which includes:
  acquiring composition information of an application to be deployed in a current cloud platform, the composition information representing attribute content and composition logic of the application to be deployed;
  determining environmental attributes of respective components included in the application to be deployed according to the composition information of the application to be deployed;
  calling corresponding cloud environment plugins for the respective components according to the environmental attributes of the respective components based on a preset multi-cloud environment configurator; and
  deploying the application to be deployed to the current cloud platform based on the cloud environment plugins of the respective components.

According to some embodiments, the step of determining the environmental attributes of the respective components included in the application to be deployed according to the composition information of the application to be deployed includes:
  generating a template file of the application to be deployed according to the composition information of the application to be deployed and deployment requirement information input by a user; and
  determining the environmental attributes of the respective components included in the application to be deployed based on a preset workflow engine and according to the template file of the application to be deployed.

According to some embodiments, the step of determining the environmental attributes of the respective components included in the application to be deployed based on the preset workflow engine and according to the template file of the application to be deployed includes:
  determining a workflow of the respective components included in the application to be deployed based on the preset workflow engine and according to the template file of the application to be deployed; and
  determining the environmental attributes of the respective components according to actions included in the workflow of the respective components.

According to some embodiments, wherein before the step of determining the environmental attributes of the respective components included in the application to be deployed according to the composition information of the application to be deployed, the method further comprises:
  constructing an application model of the application to be deployed according to the composition information of the application to be deployed; and
  the step of determining the workflow of the respective components included in the application to be deployed based on the workflow engine and according to the template file of the application to be deployed comprises:
  converting the template file of the application to be deployed into application model primitive, and inputting the application model primitive to the workflow engine to determine the workflow of the respective components included in the application to be deployed.

According to some embodiments, the step of converting the template file of the application to be deployed into the application model primitive comprises:
  performing any one or more of adding, deleting, modifying and searching operations on the application model to parse the template file into the application model primitive based on a model manager and according to the template file.

According to some embodiments, the step of determining the workflow of the respective components included in the application to be deployed based on the preset workflow engine and according to the template file of the application to be deployed comprises:
  analyzing the template file of the application to be deployed based on the preset workflow engine to determine an action set and specific action execution of the application to be deployed, to obtain the workflow of the respective components.

According to some embodiments, the step of determining the environmental attributes of the respective components according to the actions included in the workflow of the respective components comprises:
  determining a specific environmental attribute of each component according to the actions included in the workflow of the respective components and a preset corresponding relationship between each action and the environmental attributes.

According to some embodiments, the step of deploying the application to be deployed to the current cloud platform based on the cloud environment plugins of the respective components comprises:

calling corresponding cloud environment interfaces for respective component packages based on the cloud environment plugins of the respective components; and deploying the application to be deployed to the current cloud platform based on cloud environment interfaces corresponding to the respective components.

According to some embodiments, the step of deploying the application to be deployed to the current cloud platform based on the cloud environment interfaces corresponding to the respective components comprises:

for a respective component, deploying the component to a corresponding cloud environment based on the cloud environment interface corresponding to the component.

According to some embodiments, wherein after the step of deploying the application to be deployed to the current cloud platform based on the cloud environment interfaces corresponding to the respective components, the method further comprises:

correlating deployed components in the cloud platform.

According to some embodiments, the step of generating the template file of the application to be deployed according to the composition information of the application to be deployed and the deployment requirement information input by the user comprises:

generating the template file of the application to be deployed based on a preset model manager and according to the composition information of the application to be deployed and the deployment requirement information input by the user.

According to some embodiments, the composition information of the application to be deployed comprises component names, attribute information of the respective components and action information of the respective components.

According to some embodiments, the cloud platform application deployment method is applied to a multi-cloud mixed scene.

According to some embodiments, the components include any one or more of a browser and a database.

According to some embodiments, the template file is a template file based on JSON/Yaml description language.

According to some embodiments, wherein the actions comprise component actions including at least one of creating, scaling up, scaling down, starting and stopping.

According to some embodiments, the cloud environment interface is an API interface of a corresponding cloud environment.

The second aspect of the present application discloses a cloud platform application deployment apparatus, comprising:

an acquisition module configured for acquiring composition information of an application to be deployed in a current cloud platform, the composition information representing attribute content and composition logic of the application to be deployed;

a determination module configured for determining environmental attributes of respective components included in the application to be deployed according to the composition information of the application to be deployed;

a plugin calling module configured for calling corresponding cloud environment plugins for the respective components according to the environmental attributes of the respective components based on a preset multi-cloud environment configurator; and a deployment module configured for deploying the application to be deployed to the current cloud platform based on the cloud environment plugins of the respective components.

The third aspect of the present application disclose an electronic device, comprising: at least one processor and a memory; wherein the memory stores computer-executable instructions; and the at least one processor executes the computer-executable instructions stored in the memory to cause the at least one processor to perform the cloud platform application deployment method according to any one of claims 1 to 17.

The fourth aspect of the present application discloses a nonvolatile readable storage medium, wherein computer-executable instructions are stored in the nonvolatile readable storage medium, and when the computer-executable instructions are executed by a processor, the cloud platform application deployment method according to any one of claims 1 to 17 is implemented.

Technical schemes of the disclosure have following advantages:

The cloud platform application deployment method and apparatus, the electronic device and the storage medium are provided in the disclosure. The method includes: acquiring the composition information of the application to be deployed in the current cloud platform, the composition information representing the attribute content and composition logic of the application to be deployed; determining the environmental attributes of the respective components included in the application to be deployed according to the composition information of the application to be deployed; calling the corresponding cloud environment plugins for the respective components according to the environmental attributes of the respective components based on the preset multi-cloud environment configurator; and deploying the application to be deployed to the current cloud platform based on the cloud environment plugins of the respective components. According to the method provided in the above scheme, different cloud environment plugins are called for different cloud environment components according to the environmental attributes of respective components in the application to be deployed, and the application is deployed based on the called multiple cloud environment plugins, thus improving flexibility of application deployment on the cloud platform, and realizing the unified deployment of applications in the multi-cloud mixed scenes.

BRIEF DESCRIPTION OF THE DRAWINGS

In order to explain technical schemes in the embodiments of the present disclosure or the related art more clearly, the drawings required in the description of the embodiments or the prior art will be briefly introduced below. Obviously, the drawings in the following description are only embodiments of the present disclosure, and other drawings can be obtained according to provided drawings by those of ordinary skill in the art without paying creative effort.

Figure 1:
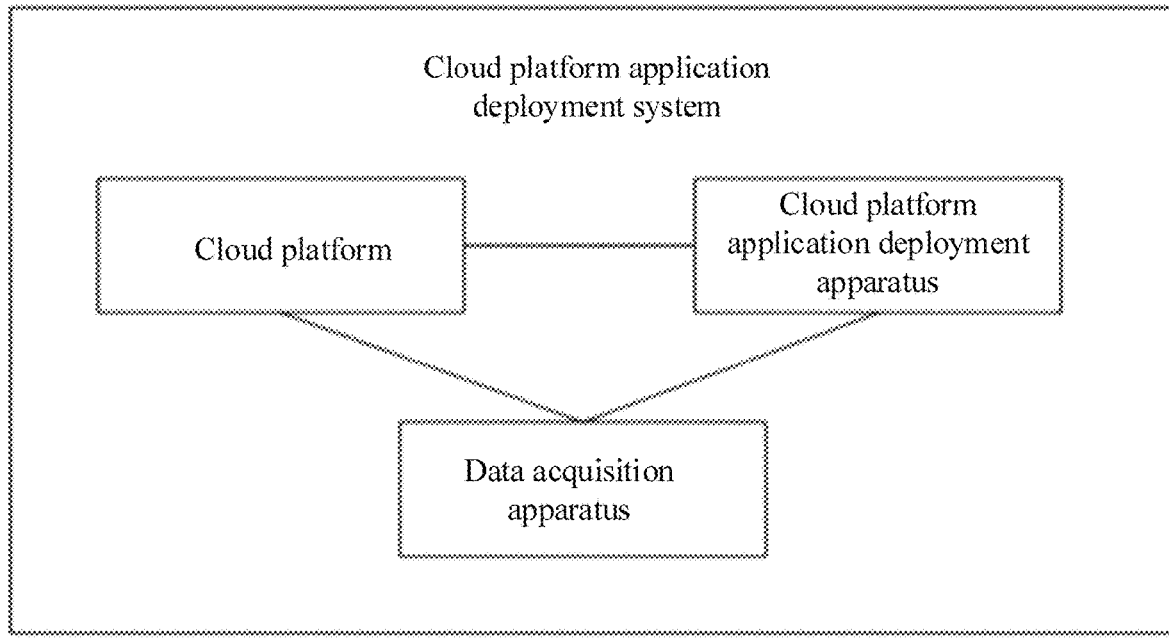
FIG. 1 is a schematic structural diagram of a cloud platform application deployment system based on an embodiment of the present disclosure.

Through above drawings, clear embodiments of the disclosure has been shown, which will be described in more detail later. These drawings and written descriptions are not intended to limit the scope of the concept of the disclosure in any way, but to explain the concept of this disclosure to those skilled in the art by referring to specific embodiments.

DETAILED DESCRIPTION

In the following, the technical scheme in the embodiment of the disclosure will be described clearly and completely in connection with the drawings; obviously, the described embodiment is intended to be only a part of the embodiment of the disclosure, but not all of them. On a basis of the embodiments in this disclosure, all other embodiments obtained by the ordinary skilled in the art without any creative effort should be within a protection scope of this disclosure.

In order to make purposes, technical schemes and advantages of embodiments of this disclosure more clear, the technical schemes in the embodiments of this disclosure will be described clearly and completely with reference to the drawings in the embodiments of this disclosure; and it is obvious that the described embodiments are part of the embodiments of this disclosure, but not all of them. On a basis of the embodiments in this disclosure, all other embodiments obtained by the ordinary skilled in the art without any creative effort should be within a protection scope of this disclosure.

In addition, terms such as "first" and "second" are only used for descriptive purposes, and cannot be understood as indicating or implying relative importance or implicitly indicating a number of indicated technical features. In following description of respective embodiments, "plural" means more than two, unless otherwise specifically defined.

In related art, application deployment and delivery are generally realized based on Kubernetes, while application deployment based on Kubernetes is generally to make the applications into Chart packages in advance, and then application deployment is made in a Kubernetes environment by using a Helm tool. However, Helm is only a package manager of a Kubernetes platform, so it is only suitable for deploying applications which are based on the Kubernetes platform. Helm does not support public/private cloud platforms such as OpenStack and AWS, and in this industry, tools such as Cloudify and Terraform are generally used to deploy applications on these cloud platforms. This will inevitably lead to two types of platforms, two types of tools and two types of technical routes, and it is impossible to realize the unified deployment of applications in the multi-cloud mixed scenes.

In order to solve above problems, in the cloud platform application deployment method and apparatus, the electronic device and the storage medium provided in the disclosure, the composition information of the application to be deployed in the current cloud platform is acquired, in which the composition information represents the attribute content and composition logic of the application to be deployed; the environmental attributes of the respective components included in the application to be deployed is determined according to the composition information of the application to be deployed; the corresponding cloud environment plugins for the respective components according to the environmental attributes of the respective components are called based on the preset multi-cloud environment configurator; and the application to be deployed to the current cloud platform is deployed based on the cloud environment plugins of the respective components. According to the method provided in the above scheme, different cloud environment plugins are called for different cloud environment components according to the environmental attributes of respective components in the application to be deployed, and the application is deployed based on the called multiple cloud environment plugins, thus improving flexibility of application deployment on the cloud platform, and realizing the unified deployment of applications in the multi-cloud mixed scenes.

Following specific embodiments can be combined with each other, and same or similar concepts or processes may not be repeated in some embodiments. Embodiments of the present disclosure may be described below with reference to the drawings.

Firstly, a structure of the cloud platform application deployment system based on this disclosure is illustrated.

The cloud platform application deployment method and apparatus, the electronic device and the storage medium according to the embodiment of the disclosure are suitable for unified deployment of cloud platform applications in the multi-cloud mixed scenes. As shown in FIG. 1, it is a schematic structural diagram of a cloud platform application deployment system according to an embodiment of this disclosure, which mainly includes a cloud platform, a data acquisition apparatus and a cloud platform application deployment apparatus for application deployment on the cloud platform. In some embodiments, the data acquisition apparatus is configured to acquire composition information of an application to be deployed on a current cloud platform, and then acquired data is sent to the cloud platform application deployment apparatus, so that the cloud platform application deployment apparatus can perform corresponding application deployment operation on the cloud platform based on the obtained data.

A cloud platform application deployment method is provided in the embodiment of the disclosure, which is used for unified deployment of cloud platform applications in the multi-cloud mixed scenes. An execution subject of the embodiment of the disclosure is an electronic device, such as a server, a desktop computer, a notebook computer, a tablet computer and other electronic device that can be used for cloud platform application deployment.

Figure 2:
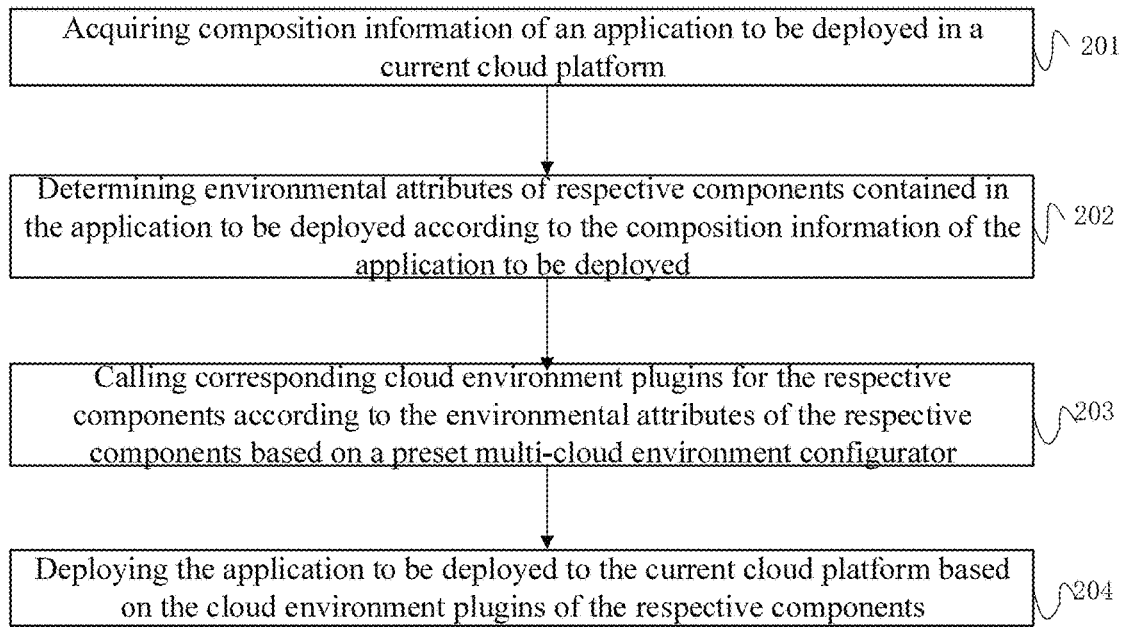
FIG. 2 is a schematic flowchart of a cloud platform application deployment method according to an embodiment of the present disclosure.

As shown in FIG. 2, it is a schematic flowchart of a cloud platform application deployment method according to an embodiment of this disclosure, and the method includes steps 201 to 204.

In step 201, composition information of an application to be deployed in a current cloud platform is acquired.

The composition information represents attribute content and composition logic of the application to be deployed, and the application to be deployed can be a computing application or a combined application.

In step 202, environmental attributes of respective components included in the application to be deployed are determined according to the composition information of the application to be deployed.

It should be noted that the application to be deployed can be composed of multiple components, such as browsers and databases.

In some embodiments, by analyzing the composition information of the application to be deployed, components included in the application to be deployed are determined, and then the environmental attributes of the components included in the application to be deployed are determined according to related information such as attributes and actions of respective components currently included. The environmental attributes at least involves cloud environments such as Kubernetes (K8s), OpenStack and AWS.

In step 203, corresponding cloud environment plugins for the respective components are called according to the environmental attributes of the respective components based on a preset multi-cloud environment configurator.

It should be noted that there are a variety of cloud environment plugins preset in the multi-cloud environment configurator, which are suitable for different cloud environments.

In some embodiments, based on the multi-cloud environment configurator, it is determined which cloud environment the respective components may be deployed to according to the environmental attributes of the respective components, and then the corresponding cloud environment plugins are assigned to the respective components to realize subsequent deployment of the components.

In step 204, the application to be deployed to the current cloud platform is deployed based on the cloud environment plugins of the respective components.

It should be noted that the cloud environment plugins can be specific program for realizing deployment of components on the cloud platform.

In some embodiments, each component can be deployed based on its corresponding cloud environment plugin, that is, all of the components can be deployed by using the cloud environment plugins of the respective components. After all of the components of the application to be deployed are deployed to the cloud platform, deployed components can be correlated correspondingly on the cloud platform, to finally realize deployment of the application to be deployed.

On a basis of the above embodiment, in order to further improve flexibility of cloud platform application deployment, as an implementable mode and in an embodiment, the determining the environmental attributes of the respective components included in the application to be deployed according to the composition information of the application to be deployed includes steps 2021 and 2022.

In step 2021, a template file of the application to be deployed is generated according to the composition information of the application to be deployed and deployment requirement information input by a user.

In step 2022, the environmental attributes of the respective components included in the application to be deployed are determined based on a preset workflow engine and according to the template file of the application to be deployed.

The template file is a specific description manner of the application to be deployed, which can be a template file based on JSON/Yaml description language.

In some embodiments, in order to ensure that the application to be deployed to the cloud platform can meet actual demands of the user, an application deployment design interface can be provided for the user before the application is deployed, so that deployment demand information input by the user can be acquired. In some embodiments, the template file of the application to be deployed can be generated by combining composition information of the application to be deployed in an initialization state and the deployment demand information input by the user. In some embodiments, the template file of the application to be deployed is generated based on a preset model manager and according to the composition information of the application to be deployed and the deployment requirement information input by the user.

In some embodiments, in an embodiment, a workflow of the respective components included in the application to be deployed can be determined based on the workflow engine and according to the template file of the application to be deployed; and the environmental attributes of the respective components are determined according to actions included in the workflow of the respective components.

The actions include component actions such as creating, scaling up, scaling down, starting and stopping.

In some embodiments, the template file of the application to be deployed can be analyzed based on the workflow engine to determine an action set and specific action execution of the application to be deployed, to obtain the workflow of the respective components. Then, a specific environmental attribute of each component is determined according to the actions included in the workflow of the respective components and a preset corresponding relationship between each action and the environmental attributes.

In some embodiments, adding, deleting, modifying and searching operations can be performed on the application model based on the model manager according to the template file, so to parse the template file into model primitives such as application name and component composition, then the model primitives are sent to the workflow engine.

In some embodiments, in an embodiment, before the environmental attributes of the respective components included in the application to be deployed are determined according to the composition information of the application to be deployed, the application model of the application to be deployed can be constructed according to the composition information of the application to be deployed.

Figure 3:
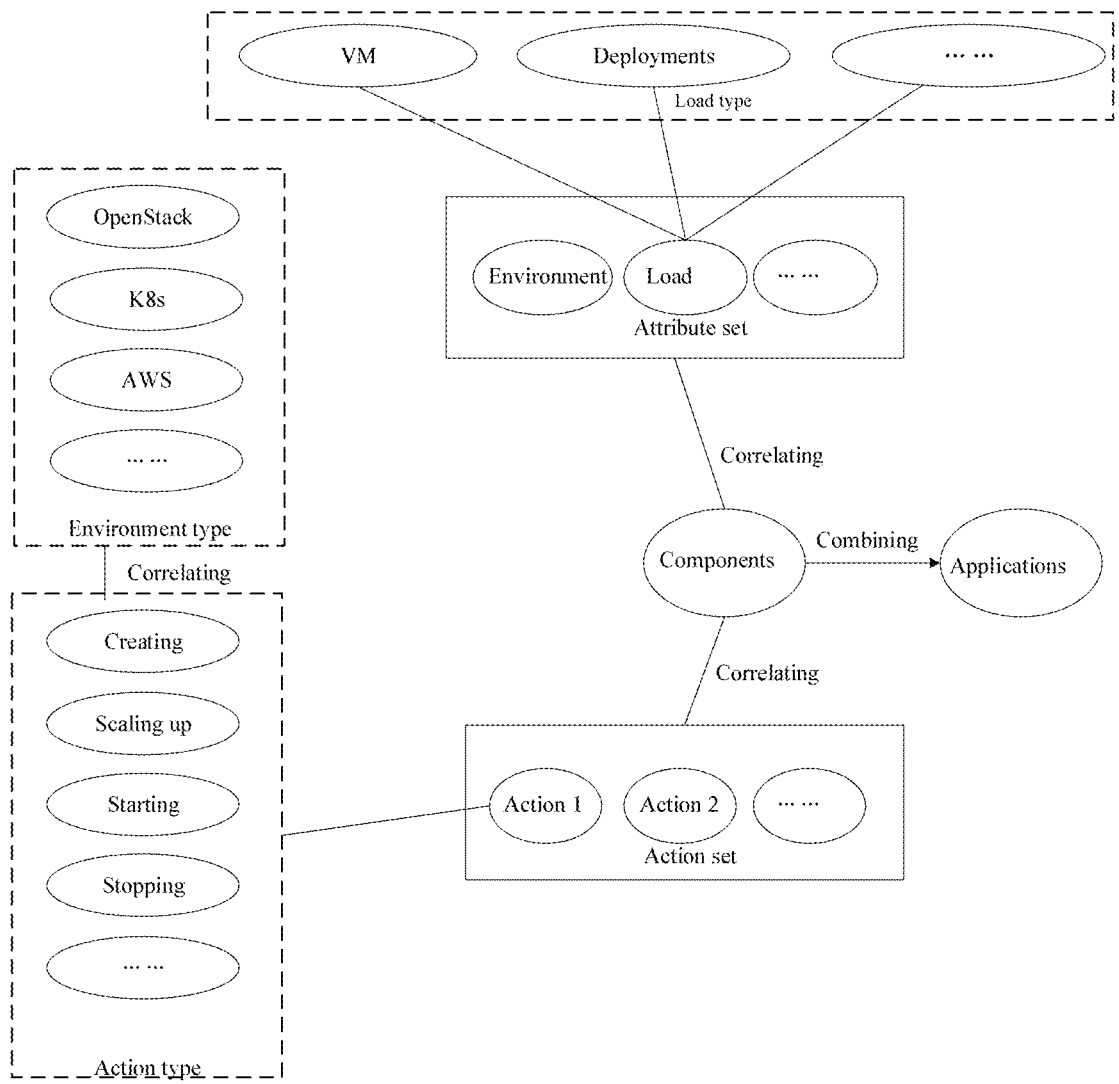
FIG. 3 is a schematic structural diagram of an exemplary application model according to an embodiment of the present disclosure.

The composition information of the application to be deployed includes component names, attribute information of the respective components and action information of the respective components. As shown in FIG. 3, it is a schematic structural diagram of an exemplary application model according to an embodiment of this disclosure, that is, by constructing the application model, the composition information of the application to be deployed can be expressed in a form of an abstract model for subsequent data analysis, application deployment or others. An attribute set in FIG. 3 includes attribute information of components, the attribute information includes environment information and load information, and the load information at least includes a load type such as virtual machine VM and Deployments. A load type of a K8s-type cloud environment is generally a K8s native resource type such as Deployments, and a load type of an OpenStack-type private cloud environment is generally cloud host VM, cloud hard Disk, or the like. The action set includes action information of components, in which an action type involves creating, scaling up, scaling down, starting, stopping or the like.

Accordingly, in an embodiment, the template file of the application to be deployed can be converted into application model primitive, and the application model primitive can be input to the workflow engine to determine the workflow of the respective components included in the application to be deployed.

In some embodiments, the workflow engine can reconstruct an application model that meets demand of the user according to the application model primitive of the template file of the application to be deployed, and then determine the workflow of the respective components included in the application to be deployed according to association between respective parts in the reconstructed application model.

On a basis of the above embodiment, as an implementable mode and in an embodiment, the deploying the application to be deployed to the current cloud platform based on the cloud environment plugins of the respective components includes steps 2041 and 2042.

In step 2041, corresponding cloud environment interfaces are called for respective component packages based on the cloud environment plugins of the respective components.

In step 2042, the application to be deployed is deployed to the current cloud platform based on cloud environment interfaces corresponding to the respective components.

It should be noted that the cloud environment interfaces can be an API interface of a corresponding cloud environment, such as an http interface.

In some embodiments, in an embodiment, for a respective component, the component can be deployed to a corresponding cloud environment based on a cloud environment interface corresponding to the component.

In some embodiments, a corresponding cloud environment can be interfaced based on the cloud environment interface corresponding to the respective component, and then management operations such as creating and deleting loads of different components can be performed in different cloud environments to realize deployment of the respective components.

In the cloud platform application deployment method provided in the disclosure, the composition information of the application to be deployed in the current cloud platform is acquired, in which the composition information represents the attribute content and composition logic of the application to be deployed; the environmental attributes of the respective components included in the application to be deployed is determined according to the composition information of the application to be deployed; the corresponding cloud environment plugins for the respective components according to the environmental attributes of the respective components are called based on the preset multi-cloud environment configurator; and the application to be deployed to the current cloud platform is deployed based on the cloud environment plugins of the respective components. According to the method provided in the above scheme, different cloud environment plugins are called for different cloud environment components according to the environmental attributes of respective components in the application to be deployed, and the application is deployed based on the called multiple cloud environment plugins, thus improving flexibility of application deployment on the cloud platform, and realizing the unified deployment of applications in the multi-cloud mixed scenes. Moreover, with an abstract and unified application model, unified modeling of application concepts in a multi-cloud mixed environment is realized, which facilitates improving of subsequent data processing efficiency and lays foundation for improving application deployment efficiency of the cloud platform.

A cloud platform application deployment apparatus is provided in an embodiment of the present disclosure, which is configured for performing the cloud platform application deployment method according to the above embodiment.

Figure 4:
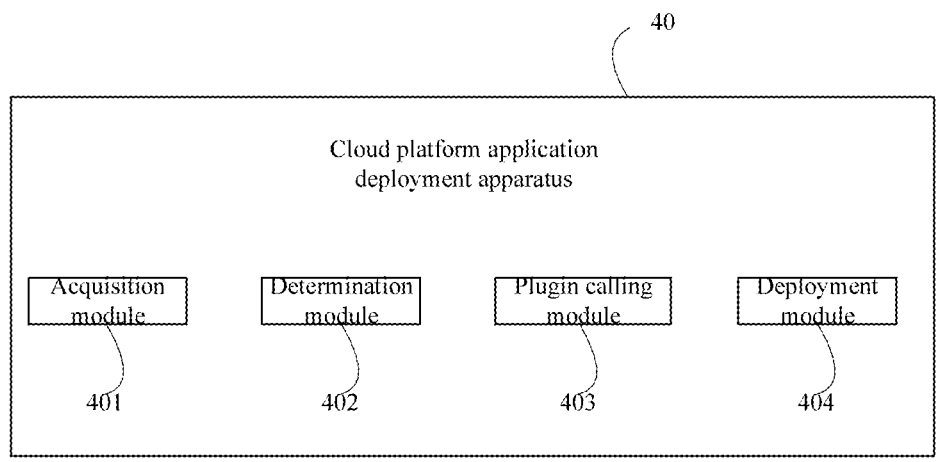
FIG. 4 is a schematic structural diagram of a cloud platform application deployment apparatus according to an embodiment of the present disclosure.

As shown in FIG. 4, it is a structural schematic diagram of the cloud platform application deployment apparatus according to the embodiment of the present application. The cloud platform application deployment apparatus 40 includes an acquisition module 401, a determination module 402, a plugin calling module 403 and a deployment module 404.

The acquisition module is configured for acquiring composition information of an application to be deployed in a current cloud platform, in which the composition information represents attribute content and composition logic of the application to be deployed. The determination module is configured for determining environmental attributes of respective components included in the application to be deployed according to the composition information of the application to be deployed. The plugin calling module is configured for calling corresponding cloud environment plugins for the respective components according to the environmental attributes of the respective components based on a preset multi-cloud environment configurator. The deployment module is configured for deploying the application to be deployed to the current cloud platform based on the cloud environment plugins of the respective components.

In some embodiments, in an embodiment, the determination module is configured for:
generating a template file of the application to be deployed according to the composition information of the application to be deployed and deployment requirement information input by a user; and
determining the environmental attributes of the respective components included in the application to be deployed based on a preset workflow engine and according to the template file of the application to be deployed.

In some embodiments, in an embodiment, the determination module is configured for:
determining a workflow of the respective components included in the application to be deployed based on the workflow engine and according to the template file of the application to be deployed; and
determining the environmental attributes of the respective components according to actions included in the workflow of the respective components.

In some embodiments, in an embodiment, the apparatus further includes:
a modeling module configured for constructing an application model of the application to be deployed according to the composition information of the application to be deployed;
a determination module configured for:
converting the template file of the application to be deployed into application model primitive, and inputting the application model primitive to the workflow engine to determine the workflow of the respective components included in the application to be deployed.

In some embodiments, in an embodiment, the determination module is configured for:
performing any one or more of adding, deleting, modifying and searching operations on the application model to parse the template file into the application model primitive based on a model manager and according to the template file.

In some embodiments, in an embodiment, the determination module is configured for:
analyzing the template file of the application to be deployed based on a preset workflow engine to determine an action set and specific action execution of the application to be deployed, to obtain the workflow of the respective components.

In some embodiments, in an embodiment, the determination module is configured for:
determining a specific environmental attribute of each component according to the actions included in the workflow of the respective components and a preset corresponding relationship between each action and the environmental attributes.

In some embodiments, in an embodiment, the deployment module is configured for:
calling corresponding cloud environment interfaces for respective component packages based on the cloud environment plugins of the respective components; and
deploying the application to be deployed to the current cloud platform based on cloud environment interfaces corresponding to the respective components.

In some embodiments, in an embodiment, the deployment module is configured for:
for a respective component, deploying the component to a corresponding cloud environment based on a cloud environment interface corresponding to the component.

In some embodiments, in an embodiment, the apparatus is further configured for:
correlating deployed components in the cloud platform.

In some embodiments, in an embodiment, the determination module is configured for:
generating the template file of the application to be deployed based on a preset model manager and according to the composition information of the application to be deployed and the deployment requirement information input by the user.

In some embodiments, in an embodiment, the composition information of the application to be deployed includes component names, attribute information of the respective components and action information of the respective components.

In some embodiments, in an embodiment, the method is applied to a multi-cloud mixed scene.

In some embodiments, in an embodiment, the components include any one or more of a browser and a database.

In some embodiments, in an embodiment, the template file is a template file based on JSON/Yaml description language.

In some embodiments, in an embodiment, the actions include component actions such as creating, scaling up, scaling down, starting and stopping.

In some embodiments, in an embodiment, the cloud environment interface is an API interface of a corresponding cloud environment.

With regard to the cloud platform application deployment apparatus in this embodiment, a specific way in which a respective module performs operations has been described in detail in the embodiment of this method, which will not be described in detail here.

The cloud platform application deployment apparatus provided in the embodiment of the present application is configured for performing the cloud platform application deployment method according to the above embodiment, with same implementation mode and principle, which will not be repeated here.

An electronic device is provided in an embodiment of the present disclosure, which is configured for performing the cloud platform application deployment method according to the above embodiment.

Figure 5:
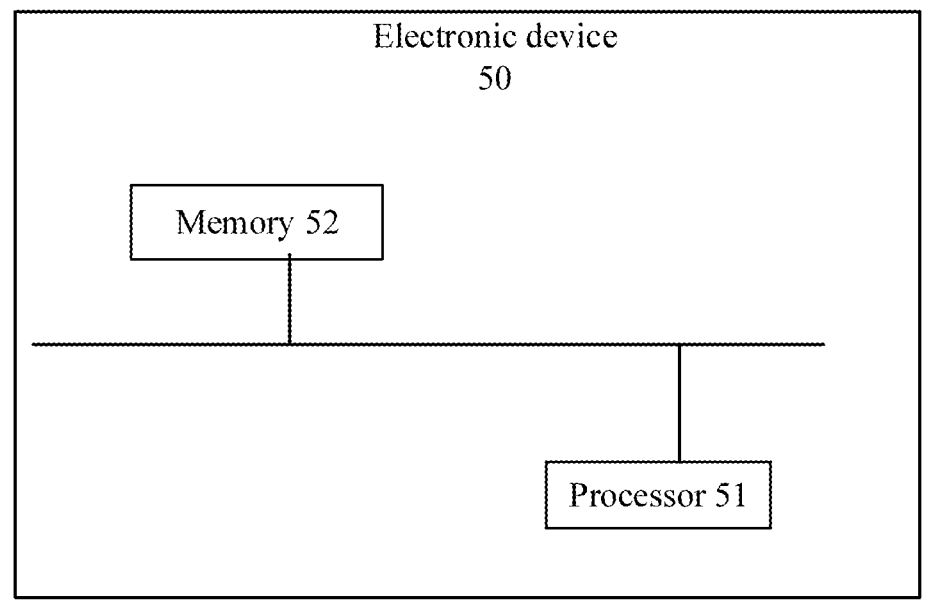
FIG. 5 is a schematic structural diagram of an electronic device according to an embodiment of the present disclosure.

As shown in FIG. 5, it is a structural schematic diagram of the electronic device according to the embodiment of the application. The electronic device 50 includes at least one processor 51 and a memory 52.

The memory stores computer-executable instructions. The at least one processor executes the computer-executable instructions stored in the memory, so that the at least one processor executes the cloud platform application deployment method according to the above embodiment.

The electronic device provided in the embodiment of the present application is configured for performing the cloud platform application deployment method according to the above embodiment, with same implementation mode and principle, which will not be repeated here.

A nonvolatile readable storage medium is provided in an embodiment of the disclosure, with computer-executable instructions stored therein, and when a processor executes the computer-executable instructions, the cloud platform application deployment method according to any of above embodiments is implemented.

The storage medium containing the computer-executable instructions according to the embodiment of the present application can be configured to store the computer-executable instructions of the cloud platform application deployment method according to the above embodiment, with same implementation mode and principle, which will not be repeated here.

In several embodiments according to this disclosure, it should be understood that the disclosed apparatus and method can be implemented in other ways. For example, the apparatus embodiment described above is only schematic. For example, division of units is only logical function division, and in actual implementation, there may be other divisions, for example multiple units or components can be combined or integrated into another system, or some features can be ignored or not implemented. On the other hand, mutual coupling or direct coupling or communication connection shown or discussed can be indirect coupling or communication connection through some interfaces, devices or units, which can be electrical, mechanical or in other forms.

Units described as separate components may or may not be physically separated, and the components shown as the units may or may not be physical units, that is, they may be located in one place or distributed over multiple network units. Some or all of the units can be selected according to actual needs to achieve purposes of this embodiment.

In addition, respective functional units in respective embodiments of the present disclosure may be integrated in a processing unit, may exist physically separately, or two or more of the units may be integrated in a unit. The above integrated units can be implemented in a form of hardware, or in a form of hardware and software functional units.

The above integrated units implemented in the form of software functional units can be stored in a computer-readable storage medium. The above software functional units are stored in a storage medium, and include several instructions to cause a computer device (which can be a personal computer, a server, a network device, etc.) or a processor to perform a part of steps of the methods in various embodiments of the present disclosure. The above storage media may include: a USB disk, a removable hard drive, a Read-Only Memory (ROM), a Random Access Memory (RAM), a magnetic disk, an optical disk and other media that may store program codes.

It can be clearly understood by those skilled in the art that for convenience and conciseness of description, division of the above functional modules is only taken as an example for illustration. In practical applications, above functions can be allocated and completed by different functional modules as required, that is, an internal structure of the apparatus is divided into different functional modules to complete all or part of the above functions. A specific operation processes of the apparatus described above can be referred to corresponding processes in the method embodiments described above, which will not be repeated herein again.

Finally, it should be noted that the above embodiments are only intended to illustrate technical schemes of the present disclosure, but not to limit it. Although the present disclosure has been described in detail with reference to the foregoing embodiments, it should be understood by ordinary skilled in the art that modifications can be made to the technical schemes described in the foregoing embodiments, or equivalent substitutions can be made to some or all of technical features thereof. These modifications or substitutions do not make essence of corresponding technical schemes depart from the scope of the technical schemes of the embodiments of this disclosure.

The invention claimed is:

1. A cloud platform application deployment method, comprising:
    acquiring composition information of an application to be deployed in a current cloud platform, the composition information representing attribute content and composition logic of the application to be deployed;
    determining environmental attributes of respective components included in the application to be deployed according to the composition information of the application to be deployed;
    calling corresponding cloud environment plugins for the respective components according to the environmental attributes of the respective components based on a preset multi-cloud environment configurator; and
    deploying the application to be deployed to the current cloud platform based on the cloud environment plugins of the respective components;
    wherein the step of determining the environmental attributes of the respective components included in the application to be deployed according to the composition information of the application to be deployed comprises:
    generating a template file of the application to be deployed according to the composition information of the application to be deployed and deployment requirement information input by a user; and
    determining the environmental attributes of the respective components included in the application to be deployed based on a preset workflow engine and according to the template file of the application to be deployed.

2. The cloud platform application deployment method according to claim 1, wherein the step of determining the environmental attributes of the respective components included in the application to be deployed based on the preset workflow engine and according to the template file of the application to be deployed comprises:
    determining a workflow of the respective components included in the application to be deployed based on the preset workflow engine and according to the template file of the application to be deployed; and
    determining the environmental attributes of the respective components according to actions included in the workflow of the respective components.

3. The cloud platform application deployment method according to claim 2, wherein: before the step of determining the environmental attributes of the respective components included in the application to be deployed according to the composition information of the application to be deployed, the method further comprises:
    constructing an application model of the application to be deployed according to the composition information of the application to be deployed; and
    the step of determining the workflow of the respective components included in the application to be deployed based on the workflow engine and according to the template file of the application to be deployed comprises:
    converting the template file of the application to be deployed into application model primitive, and inputting the application model primitive to the workflow engine to determine the workflow of the respective components included in the application to be deployed.

4. The cloud platform application deployment method according to claim 3, wherein the step of converting the template file of the application to be deployed into the application model primitive comprises:
    performing any one or more of adding, deleting, modifying and searching operations on the application model to parse the template file into the application model primitive based on a model manager and according to the template file.

5. The cloud platform application deployment method according to claim 2, wherein the step of determining the workflow of the respective components included in the application to be deployed based on the preset workflow engine and according to the template file of the application to be deployed comprises:
    analyzing the template file of the application to be deployed based on the preset workflow engine to determine an action set and specific action execution of the application to be deployed, to obtain the workflow of the respective components.

6. The cloud platform application deployment method according to claim 2, wherein the step of determining the environmental attributes of the respective components according to the actions included in the workflow of the respective components comprises:
    determining a specific environmental attribute of each component according to the actions included in the workflow of the respective components and a preset corresponding relationship between each action and the environmental attributes.

7. The cloud platform application deployment method according to claim 1, wherein the step of deploying the application to be deployed to the current cloud platform based on the cloud environment plugins of the respective components comprises:
    calling corresponding cloud environment interfaces for respective component packages based on the cloud environment plugins of the respective components; and
    deploying the application to be deployed to the current cloud platform based on cloud environment interfaces corresponding to the respective components.

8. The cloud platform application deployment method according to claim 7, wherein the step of deploying the application to be deployed to the current cloud platform based on the cloud environment interfaces corresponding to the respective components comprises:

for a respective component, deploying the component to a corresponding cloud environment based on the cloud environment interface corresponding to the component.

9. The cloud platform application deployment method according to claim 7, wherein the cloud environment interface is an API interface of a corresponding cloud environment.

10. The cloud platform application deployment method according to claim 1, wherein, after the step of deploying the application to be deployed to the current cloud platform based on the cloud environment interfaces corresponding to the respective components, the method further comprises:

correlating deployed components in the cloud platform.

11. The cloud platform application deployment method according to claim 1, wherein the step of generating the template file of the application to be deployed according to the composition information of the application to be deployed and the deployment requirement information input by the user comprises:

generating the template file of the application to be deployed based on a preset model manager and according to the composition information of the application to be deployed and the deployment requirement information input by the user.

12. The cloud platform application deployment method according to claim 1, wherein the composition information of the application to be deployed comprises component names, attribute information of the respective components and action information of the respective components.

13. The cloud platform application deployment method according to claim 1, wherein the cloud platform application deployment method is applied to a multi-cloud mixed scene.

14. The cloud platform application deployment method according to claim 1, wherein the components comprise any one or more of a browser and a database.

15. The cloud platform application deployment method according to claim 1, wherein the template file is a template file based on JSON/Yaml description language.

16. The cloud platform application deployment method according to claim 1, wherein the actions comprise component actions.

17. The cloud platform application deployment method according to claim 16, wherein the component actions comprises at least one of creating, scaling up, scaling down, starting and stopping.

18. An electronic device, comprising: at least one processor and a memory; wherein the memory stores computer-executable instructions; and the at least one processor executes the computer-executable instructions stored in the memory to cause the at least one processor to perform the cloud platform application deployment method according to claim 1.

19. A nonvolatile readable storage medium, wherein computer-executable instructions are stored in the nonvolatile readable storage medium, and when the computer-executable instructions are executed by a processor, the cloud platform application deployment method according to claim 1 is implemented.

* * * * *